(12) United States Patent
Koo et al.

(10) Patent No.: US 10,841,290 B2
(45) Date of Patent: Nov. 17, 2020

(54) APPARATUS AND METHOD FOR CONTROLLING DISPLAY IN ELECTRONIC DEVICE HAVING PROCESSORS

(71) Applicant: Samsung Electronics Co., Ltd., Gyeonggi-do (KR)

(72) Inventors: Bonhyun Koo, Gyeonggi-do (KR); Daedong Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 174 days.

(21) Appl. No.: 14/976,062

(22) Filed: Dec. 21, 2015

(65) Prior Publication Data

US 2016/0182482 A1  Jun. 23, 2016

(30) Foreign Application Priority Data

Dec. 19, 2014 (KR) .................. 10-2014-0184861

(51) Int. Cl.
*H04L 29/06* (2006.01)
*H04W 12/06* (2009.01)
(Continued)

(52) U.S. Cl.
CPC .......... *H04L 63/08* (2013.01); *G07C 9/27* (2020.01); *H04L 63/0876* (2013.01);
(Continued)

(58) Field of Classification Search
CPC ..................... H04L 63/08; H04L 63/102
(Continued)

(56) References Cited

U.S. PATENT DOCUMENTS 9,210,192 B1 * 12/2015 Kim ................... H04L 41/0806
2002/0176323 A1 * 11/2002 Magine ................. B63C 11/26
367/134
(Continued)

FOREIGN PATENT DOCUMENTS

CN       1414751       4/2003
CN       1705399       12/2005
(Continued)

OTHER PUBLICATIONS

International Search Report dated Mar. 24, 2016 issued in counterpart application No. PCT/KR2015/014042, 3 pages.
(Continued)

*Primary Examiner* — Andrew J Steinle
*Assistant Examiner* — Sakinah White Taylor
(74) *Attorney, Agent, or Firm* — The Farrell Law Firm, P.C.

(57) ABSTRACT

The present disclosure relates to a sensor network and Internet of Things (IoT) as applied to intelligent services based technologies such as smart home, smart building, smart city, smart car, connected car, health care, digital education, smart retail, security and safety services.
An apparatus and method for controlling an electronic device through a mesh network of such electronic devices are provided. In a method for controlling an electronic device, a terminal transmits to the electronic device, a terminal identifier for authenticating the terminal and information for authenticating a user of the terminal. If authentication of the terminal is successfully completed, the terminal transmits control information containing at least one service identifier classified according to service types to the electronic device. The control information is transmitted to another electronic device, based on the service identifier,
(Continued)

through a network in which the electronic device is connected to another electronic device.

24 Claims, 17 Drawing Sheets

(51) Int. Cl.
*H04W 84/18* (2009.01)
*G07C 9/27* (2020.01)
*H04W 4/80* (2018.01)
*H04W 12/00* (2009.01)

(52) U.S. Cl.
CPC .......... *H04L 63/102* (2013.01); *H04W 12/06* (2013.01); *H04W 84/18* (2013.01); *G07C 2209/63* (2013.01); *H04L 63/0492* (2013.01); *H04W 4/80* (2018.02); *H04W 12/00503* (2019.01)

(58) Field of Classification Search
USPC .............................................. 726/7
See application file for complete search history.

(56) References Cited

U.S. PATENT DOCUMENTS

| | | | |
|---|---|---|---|
| 2003/0079144 A1 | 4/2003 | Kakemizu et al. | |
| 2004/0208151 A1* | 10/2004 | Haverinen | H04L 29/12 370/338 |
| 2006/0172700 A1 | 8/2006 | Wu | |
| 2007/0036359 A1* | 2/2007 | Suzuki | H04L 63/0823 380/270 |
| 2007/0189247 A1* | 8/2007 | Wang | H04W 84/20 370/338 |
| 2007/0206838 A1* | 9/2007 | Fouquet | G06F 21/35 382/115 |
| 2009/0239587 A1 | 9/2009 | Negron et al. | |
| 2009/0327910 A1 | 12/2009 | Black et al. | |
| 2011/0201275 A1* | 8/2011 | Jabara | H04L 12/5692 455/41.2 |
| 2012/0086563 A1 | 4/2012 | Arling et al. | |
| 2013/0064088 A1 | 3/2013 | Yu et al. | |
| 2013/0217332 A1* | 8/2013 | Altman | H04H 60/90 455/41.2 |
| 2013/0251150 A1* | 9/2013 | Chassagne | G01S 1/042 380/270 |
| 2013/0267168 A1 | 10/2013 | Jeon et al. | |
| 2013/0268998 A1 | 10/2013 | Ko et al. | |
| 2013/0288668 A1* | 10/2013 | Pragada | H04M 15/8033 455/426.1 |
| 2013/0294434 A1* | 11/2013 | Lee | H04W 76/14 370/338 |
| 2014/0064184 A1* | 3/2014 | Cherian | H04L 61/103 370/328 |
| 2014/0129006 A1* | 5/2014 | Chen | G05B 15/02 700/90 |
| 2014/0304837 A1 | 10/2014 | Mogaki | |
| 2015/0348049 A1* | 12/2015 | Todasco | G06Q 10/02 705/5 |
| 2015/0356289 A1* | 12/2015 | Brown | G06F 21/44 726/7 |
| 2016/0105344 A1* | 4/2016 | Kim | H04L 43/08 709/224 |
| 2016/0134620 A1* | 5/2016 | Morrison | H04W 4/023 726/6 |

FOREIGN PATENT DOCUMENTS

| | | |
|---|---|---|
| CN | 1816136 | 8/2006 |
| CN | 1929382 | 3/2007 |
| CN | 101697245 | 4/2010 |
| CN | 101894452 | 11/2010 |
| CN | 102864984 | 1/2013 |
| CN | 103369390 | 10/2013 |
| CN | 104205902 | 12/2014 |
| EP | 2 648 118 | 10/2013 |
| KR | 20130040634 A * | 4/2013 ............ H04W 4/023 |
| WO | WO 2009/158335 | 12/2009 |
| WO | WO 2012/134681 | 10/2012 |

OTHER PUBLICATIONS

European Search Report dated Dec. 5, 2017 issued in counterpart application No. 15870397.5-1870, 7 pages.
Chinese Office Action dated Aug. 29, 2019 issued in counterpart application No. 201510958539.2, 42 pages.

* cited by examiner

FIG. 4B

Authentication request message ~410B

POST : http://auth.samsungosp.com/auth/oauth2/token
HTTP/1.1
Connection : close
Content-type : application/x-www-form-urlencoded
Host : auth.samsungosp.com
scope=default&
grant_type=<u>authorization_code</u>&~413B
service_type=M&
client_id=c7hc8m4900&
client_secret=B5B9B48012665C4F1914C52B4B6DD2F4&
code=<u>GON2ofYLF9</u>~417B

Authentication result message ~420B

HTTP/1.1 200 OK~421B
{
"access_token"."9y5Vugi7cM"    ⟶ Access information~425B
"token_type"."bearer",
"access_token_expires_in":2592000,
"expires_in":2592000,
"represh_token"."Tit8B3acNh",    ⟶ Refresh information~423B
"represh_token_expires_in":7776000,
"userId"."60bkswda8e"
}

FIG. 11
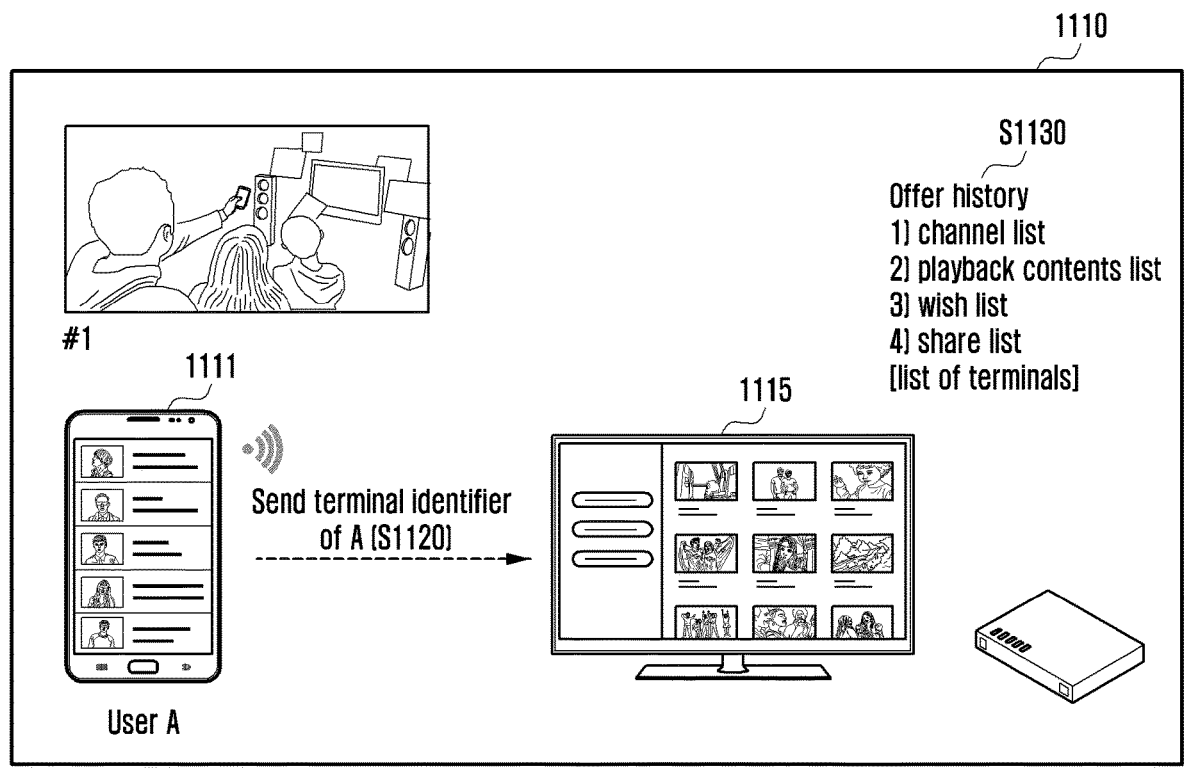
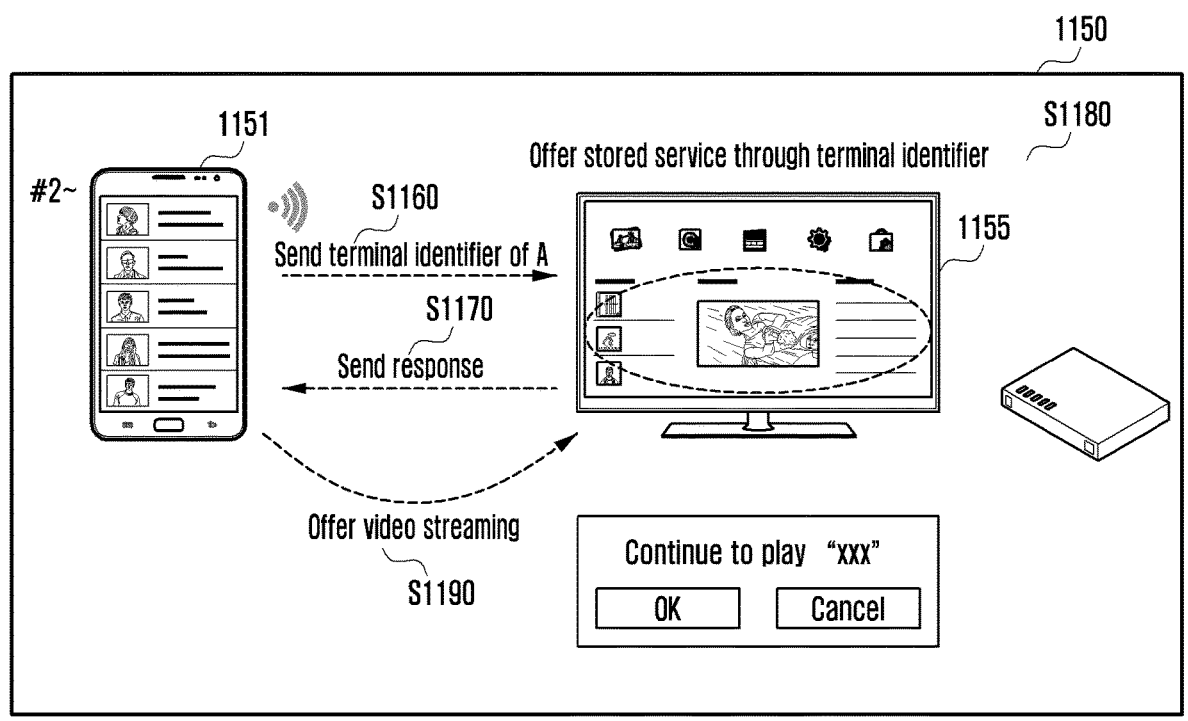

APPARATUS AND METHOD FOR CONTROLLING DISPLAY IN ELECTRONIC DEVICE HAVING PROCESSORS

PRIORITY

This application claims priority under 35 U.S.C. § 119(a) to a Korean Patent Application filed on Dec. 19, 2014 in the Korean Intellectual Property Office and assigned Serial No. 10-2014-0184861, the entire disclosure of which is incorporated herein by reference.

BACKGROUND

1. Field of the Disclosure

The present disclosure relates to techniques to control an electronic device, and more particularly, to an apparatus and method for controlling an electronic device capable of communication through a mesh network of such electronic devices.

2. Description of the Related Art

The Internet, which is a human centered connectivity network where humans generate and consume information, is now evolving to the Internet of Things (IoT) where distributed entities exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "security technology" are in demand for IoT implementation, a sensor network, a Machine-to-Machine (M2M) communication, Machine Type Communication (MTC), and so forth have been recently researched.

Such an IoT environment may provide intelligent Internet technology services that create new value to human life by collecting and analyzing data generated among connected things. IoT may be applied to a variety of fields including smart home, smart building, smart city, smart car or connected cars, smart grid, health care, smart appliances and advanced medical services through the convergence and combination of existing Information Technology (IT) and various industrial applications.

The Global Positioning System (GPS) provides the ability to identify the current position of a user's terminal, such as a smart phone or a wearable device, by using a minimum of three satellites. However, GPS has significant limitations in identifying the position of a user's terminal that resides in the interior of a building or other structure that blocks the reception of the GPS satellite signals.

Beacon technology, e.g., based on Bluetooth™, makes it possible to identify the position of a user's terminal by generating and transmitting a signal from a beacon to the terminal located within a specific area. A device that generates such a signal and identifies the position of the terminal is often referred to as a beacon or beacon device.

Using such beacon technology, it is possible to measure and determine the position of a user's terminal in the interior of a building or other structure.

However, the use of beacon technology for indoor positioning has serious security issues since communication using Bluetooth™ is performed with all terminals distributed within signal strength range of the beacon. Furthermore, the communication range of a beacon is limited in area. Power consumption and latency are increased when a terminal for controlling several electronic devices is required to individually transmit control information to the respective devices.

SUMMARY

The present disclosure has been made to address at least the disadvantages described above and to provide at least the advantages described below.

In order to meet the above needs, the present disclosure provides methods to allow automatic authentication of a user's terminal and control an electronic device through a mesh network formed of such electronic devices having the ability to communicate with each other.

According to an embodiment of the present disclosure, a terminal for controlling an electronic device includes a communication unit configured to transmit and receive a signal; and a control unit configured to control the communication unit to transmit, to the electronic device, a terminal identifier for authenticating the terminal and information for authenticating a user of the terminal, and if authentication of the terminal is successfully completed, the communication unit of the terminal transmits control information containing at least one service identifier classified according to service types to the electronic device. In the terminal, the control information is transmitted to another electronic device, based on the service identifier, through a network in which the electronic device is connected to another electronic device.

According to an embodiment of the present disclosure, an electronic device capable of communication includes a communication unit configured to transmit and receive a signal; and a control unit configured to control the communication unit to receive from a terminal, a terminal identifier for authenticating the terminal and information for authenticating a user of the terminal. If authentication of the terminal is successfully completed, the communication unit of the electronic device receives control information containing at least one service identifier classified according to service types from the terminal. Based on the service identifier, the electronic device decides whether to control the communication unit to transmit the control information to another electronic device through a network in which the electronic device is connected to another electronic device.

According to an embodiment of the present disclosure, a method for controlling an electronic device from a terminal includes transmitting to the electronic device a terminal identifier for authenticating the terminal and information for authenticating a user of the terminal. If authentication of the terminal is successfully completed, transmitting control information containing at least one service identifier classified according to service types from the terminal to the electronic device. In this method, the control information is transmitted to another electronic device based on the service identifier, through a network in which the electronic device is connected to another electronic device.

According to embodiment of the present disclosure, a method of operation of an electronic device which is capable of communication includes receiving from a terminal, a terminal identifier for authenticating the terminal and information for authenticating a user of the terminal. If authentication of the terminal is successfully completed the electronic device receives control information containing at least one service identifier classified according to service types from the terminal. The electronic device determines whether to operate, based on the service identifier and transmits the control information to another electronic device through a network in which the electronic device is connected to the another electronic device.

BRIEF DESCRIPTION OF THE DRAWINGS

The above and other aspects, features and advantages of the present disclosure will be more apparent from the following detailed description, taken in conjunction with the accompanying drawings, in which:

FIG. 11 is a diagram illustrating services offered by an electronic device according to an embodiment of the present disclosure;

DETAILED DESCRIPTION

Figure 1:
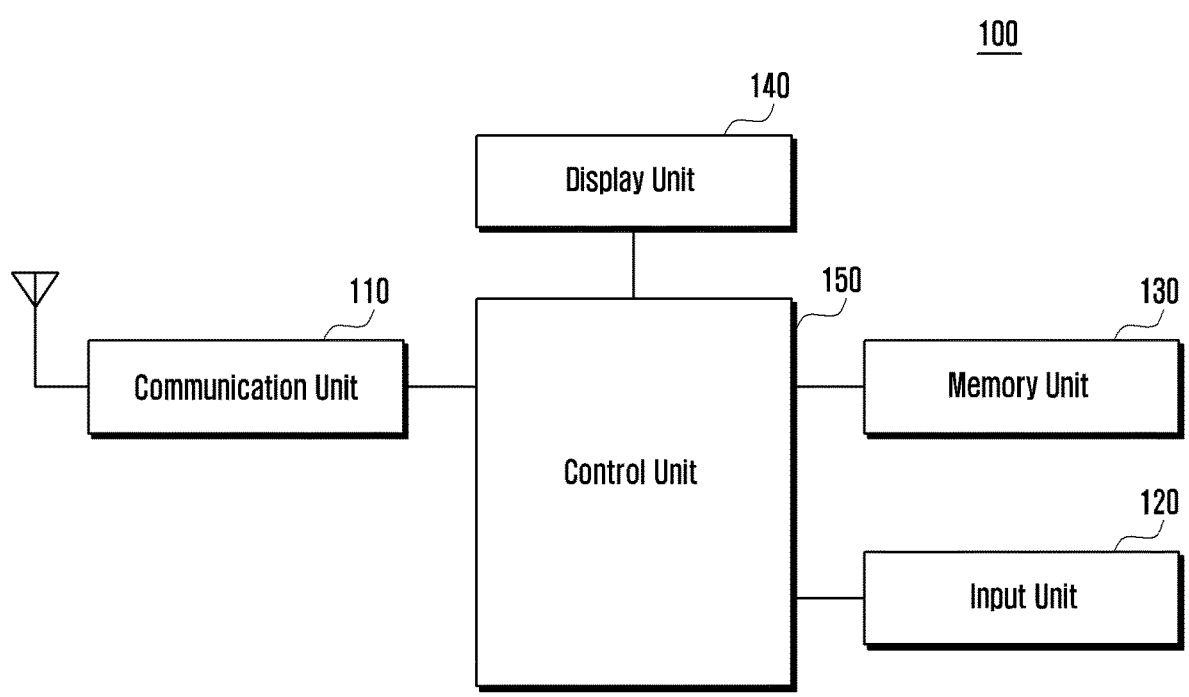
FIG. 1 is a block diagram illustrating the internal structure of a terminal according to an embodiment of the present disclosure.

Embodiments of the present disclosure will be described herein below with reference to the accompanying drawings.

The present disclosure may be embodied in many different forms and should not be construed as limited to the embodiments set forth herein. Rather, the disclosed embodiments are provided so that this disclosure will be thorough and complete, and will fully convey the scope of the disclosure to those skilled in the art. The principles and features of the present disclosure may be employed in varied and numerous embodiments without departing from the scope of the disclosure.

Furthermore, well known or widely used techniques, elements, structures, and processes may not be described or illustrated in detail to avoid obscuring the essence of the present disclosure. Although the drawings represent particular embodiments, the drawings are not necessarily to scale and certain features may be exaggerated or omitted in order to better illustrate and explain the present disclosure. Through the drawings, the same or similar reference numerals denote corresponding features consistently.

Unless defined differently, all terms used herein, which include technical terminologies or scientific terminologies, have the same meaning as that understood by a person skilled in the art to which the present disclosure belongs. Singular forms are intended to include plural forms unless the context clearly indicates otherwise.

Terms such as "comprise", "include", "may have" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof. The expression "or" includes any and all combinations of the associated listed words. For example, the expression "A or B" may include A, may include B, or may include both A and B.

As used herein, expressions including ordinal numbers, such as "first" and "second," etc., may modify various elements. However, such elements are not limited by the above expressions. For example, the above expressions do not limit the sequence and/or importance of the elements. The above expressions are used merely for the purpose of distinguishing an element from the other elements. For example, a first user device and a second user device indicate different user devices although both of them the first user device and the second user device are user devices. For example, a first element may be referred to as a second element, and similarly, a second element may be referred to as a first element without departing from the scope of the present disclosure.

FIG. 1 is a block diagram illustrating the internal structure of a terminal according to an embodiment of the present disclosure.

As shown in FIG. 1, the terminal 100 includes a communication unit 110, an input unit 120, a memory unit 130, a display unit 140, and a control unit 150.

The communication unit 110 transmits and receives data for wireless communication of the terminal 100. Specifically, the communication unit 110 may receive data to be delivered to the control unit 150, through a wireless channel and also transmit data from the control unit 150, through a wireless channel. The communication unit 110 may perform short range communication with an electronic device. The short range communication includes Bluetooth™, Zigbee™, ultra wideband (UWB)™, and the like. According to an embodiment of the present disclosure, the communication unit 110 receives a beacon signal from an electronic device. This beacon signal is used for identifying the position of the terminal 100.

The input unit 120 receives a user's inputs for controlling an electronic device, creates a corresponding input signal, and delivers the input signal to the control unit 150.

The memory unit 130 stores user account information and a terminal identifier. The user account information refers to specific information used for identifying a user, and the terminal identifier refers to specific information used for identifying the terminal 100. If the terminal 100 approaches a certain electronic device within a given distance, the terminal 100 may transmit the terminal identifier and the account information stored in the memory unit 130, to the electronic device through the communication unit 110. Additionally, the memory unit 130 may store a list of electronic devices which are controllable by the terminal 100. Therefore, when the authentication of the terminal 100 is successfully completed, the terminal 100 may control the electronic devices specified in the list by using a mesh network. A detailed description associated with the mesh network will be made below.

The display unit 140 may be formed of liquid crystal display (LCD), organic light emitted diode (OLED), and the like. In case of a touch screen, the display unit 140 may be combined with a touch panel or a touch film. The display unit 140 visually provides to a user, a menu of the terminal 100, entered data, a list of controllable electronic devices, and/or any other information.

The control unit 150 controls the operation of the terminal 100. In particular, when the authentication of the terminal 100 is successfully completed, the control unit 150 transmits control information, containing a service identifier for identifying an electronic device to be controlled, to the electronic device and then controls the electronic device.

Figure 2:
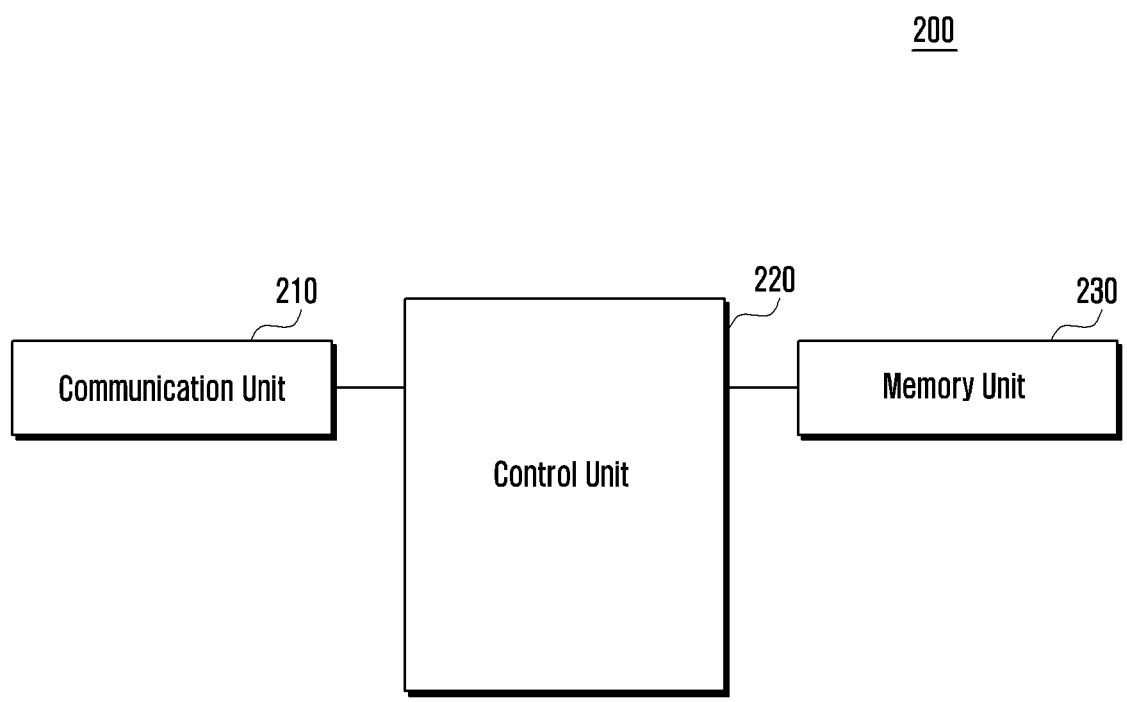
FIG. 2 is a block diagram illustrating the internal structure of an electronic device according to an embodiment of the present disclosure.

FIG. 2 is a block diagram illustrating the internal structure of an electronic device according to an embodiment of the present disclosure.

As shown in FIG. 2, the electronic device 200 may include a communication unit 210, a control unit 220, and a memory unit 230.

The communication unit 210 performs communication with the terminal. Particularly, the communication unit 210 performs short range communication with the terminal. The short range communication may include Bluetooth™, Zigbee™, UWB™, and the like. According to an embodiment of the present disclosure, the communication unit 210 transmits a beacon signal to the terminal in order to identify the position of the terminal.

The control unit 220 controls the operation of the electronic device 200. In particular, when the authentication of the terminal is successfully completed, the control unit 220 controls a particular operation of the electronic device 200. For example, if the electronic device 200 is a door lock, the control unit 220 may unlock the door lock.

Additionally, when the terminal transmits a beacon signal to the electronic device 200, the control unit 220 determines the position of the terminal on the basis of the beacon signal.

Additionally, the control unit 220 receives control information containing a service identifier from the terminal. The control unit 220 controls the electronic device 200, based on the received control information.

The memory unit 230 stores different terminal identifiers. For example, in the case of a family with four people, each individual person may have one or more terminals. In this case, the memory unit 230 may store identifiers of all terminals in that family.

Figure 3:
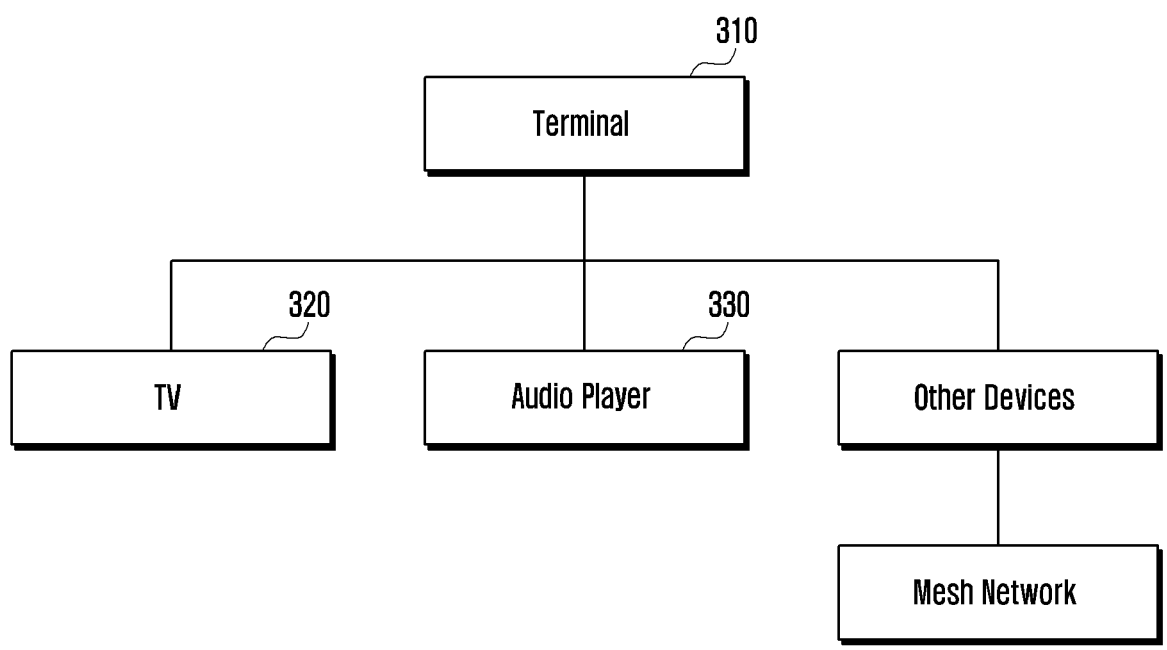
FIG. 3 is a block diagram illustrating electronic devices being controlled by a terminal according to an embodiment of the present disclosure.

FIG. 3 is a diagram illustrating electronic devices being controlled by a terminal according to an embodiment of the present disclosure.

The terminal 310 may control a plurality of electronic devices that reside in the interior of a building or house (namely, indoor electronic devices). The terminal 310 and the respective indoor electronic devices communicate with each other. For example, the terminal 310 performs at least one of multiple short range communication, such as Bluetooth™, Zigbee™, or UWB™, with each individual electronic device. However, the present disclosure is not limited to the control of indoor electronic devices.

Referring to FIG. 3, the terminal 310 may control a TV 320 and an audio player 330, for example. The terminal 310 may also control any other electronic device connected through a mesh network.

In order to control an electronic device, the terminal is required to successfully pass an authentication process for determining whether the terminal is registered in the electronic device. The authentication process will be described in detail.

Figure 4:
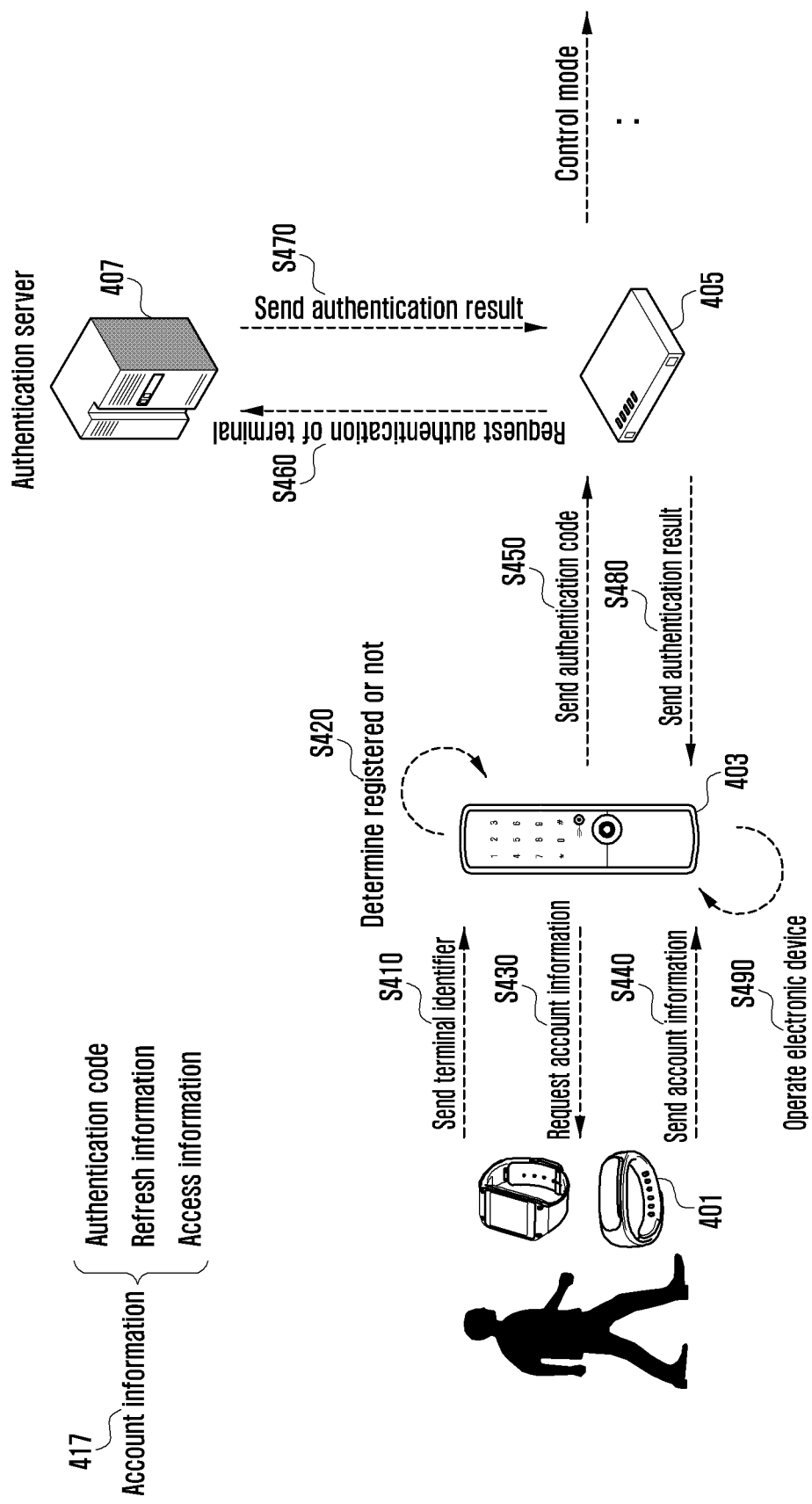
FIG. 4A is a diagram illustrating the method of authenticating a terminal according to an embodiment of the present disclosure.
FIG. 4B is a diagram illustrating an example of a terminal authentication request message and an example of an authentication reply message according to an embodiment of the present disclosure.

FIG. 4A is a diagram illustrating the process of authenticating a terminal according to an embodiment of the present disclosure.

When the terminal 401 approaches an electronic device 403 within a given distance, the terminal 401 transmits a terminal identifier for identifying the terminal to the electronic device 403 at step S410.

The terminal 401 directly transmits such a terminal identifier to the electronic device 403 that allows communication. The terminal 401 directly transmits account information for identifying a user to the electronic device 403. Based on such information for identifying the terminal 401 and the user, it is possible to provide a service or perform authentication according to each terminal and user.

According to typical beacon technology, a device capable of transmitting a beacon signal sends information containing a specific identifier to a terminal. Then the terminal may execute a specific application based on the received information. According to an embodiment of the present disclosure, the terminal 401 transmits identifiers for identifying the terminal and the user, so that the electronic device 403 independently or in coordination with the authentication server 407 may authenticate such terminals. For example, if the electronic device stores identifiers corresponding to the terminals of four people who belong to a certain family, the electronic device may authenticate each individual person. Also, the electronic device may separately provide services to individual people through the stored identifiers.

The electronic device 403 may directly communicate with the terminal 401 or communicate with the terminal 401 through another device, e.g., a beacon device, which is attached thereto and capable of communication. For example, the terminal 410 performs at least one of multiple short range communication, such as Bluetooth™, Zigbee™, or UWB™.

The electronic device 403 may identify the position of the terminal 401 by receiving a beacon signal from the terminal 401 and computing the distance and position of the terminal 401.

The electronic device 403 receives beacon data from the terminal 401 and thereby measures the distance and position of the terminal 401. The electronic device 403 may recognize the terminal 401 approaching the electronic device 403, based on the measured position of the terminal 401, and operate without requiring the user to enter a PIN code.

When the terminal identifier is received from the terminal 401 at step S410, the electronic device 403 determines at step S420 whether the terminal identifier has been registered therein. The electronic device 403 may have several terminal identifiers stored therein, and when a certain terminal identifier is received, compares the received identifier with the stored identifiers to determine whether the terminal 401 has been registered in the electronic device 403.

If the received terminal identifier is registered in the electronic device 403, the electronic device 403 requests account information 417 from the terminal 401 at step S430. The account information refers to specific information for identifying the user of the terminal 401. One or more terminal identifiers may be linked to the account information on a hierarchical level. A single user may sometimes have two or more terminals 401 while always having single account information. Therefore, such terminal identifiers corresponding to respective terminals may be linked to the account information.

The account information 417 may contain an authentication code, refresh information and access information. The refresh information refers to information for regenerating the access information, and the access information refers to information used for authentication of the terminal.

When a request for account information is received from the electronic device 403, the terminal 401 transmits an authentication code to the electronic device 403 at step S440. Since user authentication based on the refresh information and the access information both of which are normally used for actual authentication may incur a security problem, the authentication code may be used alternatively.

The electronic device 403 that receives the authentication code transmits the received authentication code to a gateway 405 at step S450. The gateway 405 refers to a device that connects the electronic device 403 with a network. At step S460, the gateway 405 transmits the received authentication code to an authentication server 407 and requests the authentication of the terminal.

Alternatively, the electronic device 403 may transmit the authentication code to the authentication server 407 without passing through the gateway 405 to request the authentication of the terminal.

The authentication server 407 performs an authentication process for the terminal by using the authentication code received from the gateway 405 or the electronic device 403.

When the authentication of the terminal is completed, the authentication server 407 transmits an authentication result to the gateway 405 at step S470. The gateway 405 then transmits the received authentication result to the electronic device 403 at step S480. Alternatively, the authentication server 407 may directly transmit an authentication result to the electronic device 403.

The electronic device 403 that receives the authentication result from the gateway 405 or the authentication server 407 may operate with the terminal at step S490 depending on whether the authentication fails or succeeds to authenticate and authorize the terminal. For example, let's suppose that the electronic device 403 is a door lock. If the terminal identifier is registered in the door lock, and if successful authentication is completed using an authentication code transmitted by the terminal, the door lock may be unlocked automatically.

FIG. 4B is a diagram illustrating an example of an authentication request message and an example of an authentication result message according to an embodiment of the present disclosure.

The gateway 405 that receives the authentication code from the electronic device 403 may transmit an authentication request message 410B containing the received authentication code to the authentication server 407 at step S460 discussed above with reference to FIG. 4A. This authentication request message 410B may include an authentication code 417B (or may be referred to as an authorization code) and an indication part 413B which indicates that a message relates to an authentication code.

In the case of successful user authentication, the authentication server 407 transmits an authentication result message 420B to the gateway 405 at step S470 discussed above with reference to FIG. 4A. The authentication result message 420B contains 200 OK 421B that indicates a successful response. In addition, the authentication result message 420B may include refresh information 423B and access information 425B, both of which are provided to prevent the expiration of refresh information and access information contained in the gateway 405.

Figure 5:
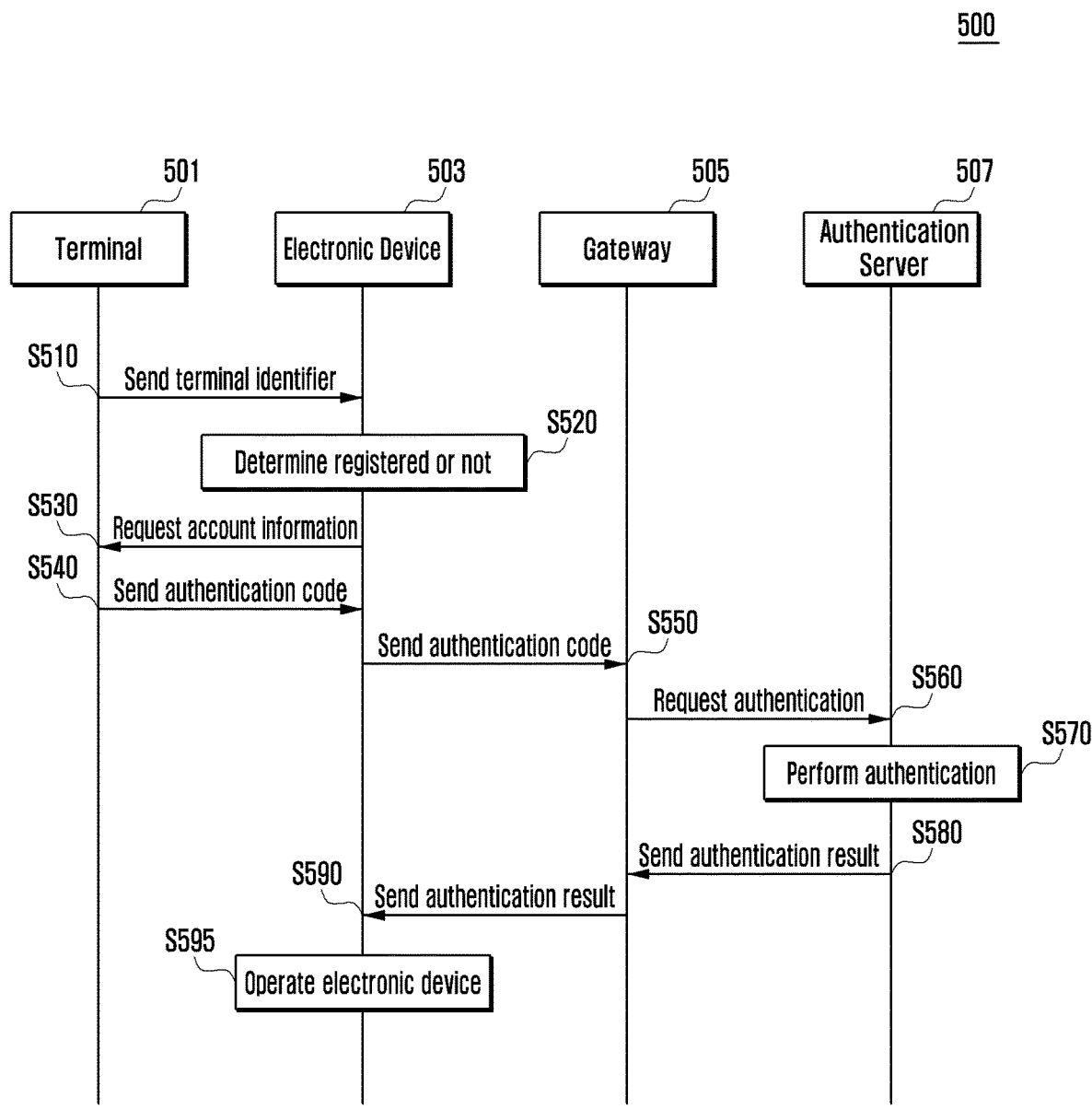
FIG. 5 is a flow diagram illustrating the method of authenticating a terminal through an electronic device according to an embodiment of the present disclosure.

FIG. 5 is a flow diagram illustrating the process of authenticating a terminal through an electronic device according to an embodiment of the present disclosure.

When the terminal 501 approaches the electronic device 503 within a given distance, the terminal 501 transmits a terminal identifier for identifying the terminal to the electronic device 503 at step S510.

Alternatively, in an embodiment of the present disclosure, the terminal 501 may broadcast a terminal identifier continuously or periodically. When the terminal 501 enters a specific area that allows the electronic device 503 to receive data packets from a certain terminal, the electronic device 503 receives the broadcasted terminal identifier. As will be discussed below, the terminal 501 may also broadcast information for identifying a user.

Since the terminal 501 transmits information for identifying the terminal and the user thereof, it is possible to separately offer a service or individually perform authentication according to each terminal and user.

The electronic device 503 may directly communicate with the terminal 501 or communicate with the terminal 501 through a device which is attached thereto and capable of communication. Additionally, the electronic device 503 may identify the distance or position of the terminal 501 by transmitting a beacon signal to the terminal 501.

When the terminal identifier is received from the terminal 501, the electronic device 503 determines at step S520 whether the terminal identifier has been previously registered therein. The electronic device 503 may have several terminal identifiers stored therein.

For example, if a family is comprises four people, and if each individual person has one or more terminals, a total of four or more terminal identifiers may be registered in the electronic device 503. Therefore, when a certain terminal identifier is received, the electronic device 503 compares the received identifier with the stored identifiers and thereby determines whether a corresponding terminal has been previously registered therein.

If the received terminal identifier is registered in the electronic device 503, the electronic device 503 requests account information from the terminal 501 at step S530. The account information refers to specific information to be used for identifying a user of the terminal 501.

In the case of identifying the position of a terminal by using a beacon signal and then offering a service to the terminal, security problem may result. Therefore, in this embodiment, an additional authentication process is performed using the user's account information.

As discussed above with reference to FIG. 4A, one or more terminal identifiers may be linked to the account information on a hierarchical level. Additionally, the account information may contain an authentication code, refresh information and access information.

When a request for the account information is received from the electronic device 503, the terminal 501 transmits an authentication code to the electronic device 503 at step S540. Since the user authentication is based on the refresh information and the access information both of which are normally used for actual authentication may potentially incur a security problem, the authentication code may be used alternatively.

The electronic device 503 that receives the authentication code transmits the received authentication code to the gateway 505 at step S550. The gateway 505 is a device that connects the electronic device 503 with a network. At step S560, the gateway 505 transmits the received authentication code to an authentication server 507 and then requests the authentication of the terminal.

Alternatively, the electronic device 503 may transmit the authentication code to the authentication server 507 without passing through the gateway 505 and then request the authentication of the terminal.

At step S570, the authentication server 507 performs an authentication process for the terminal 501 by using the authentication code received from the gateway 505 or the electronic device 503.

When the authentication of the terminal 501 is completed, the authentication server 507 transmits the authentication result to the gateway 505 at step S580. The gateway 505 transmits the received authentication result to the electronic device 503 at step S590. Alternatively, the authentication server 507 may directly transmit the authentication result to the electronic device 503.

The electronic device 503 that receives the authentication result from the gateway 505 or the authentication server 507 may operate at step S595 depending on the authentication process results in authorization of the terminal 501. For example, if the electronic device 503 is a door lock, the terminal identifier is registered in the door lock, and if successful authentication is completed using an authentication code transmitted by the terminal, the door lock may be unlocked automatically.

Figure 6:
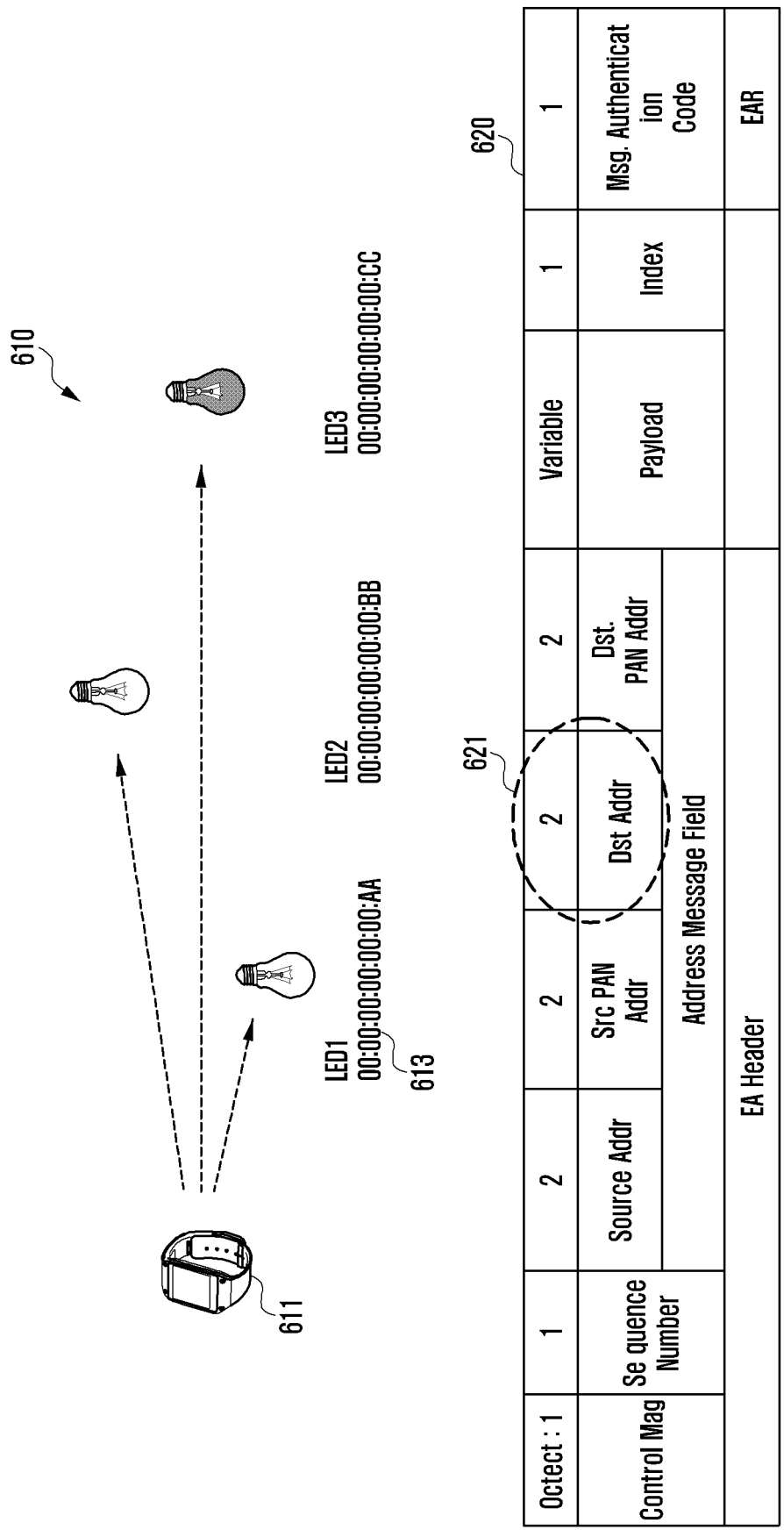
FIG. 6 is a diagram illustrating a method for controlling an electronic device from a terminal according to an embodiment of the present disclosure.

FIG. 6 is a diagram illustrating a method for controlling an electronic device at a terminal according to an embodiment of the present disclosure.

As indicated by reference number 610, the terminal 611 may control electronic devices such as LEDs as shown. When the terminal 611 approaches such LEDs, the LED may perform an authentication process for the terminal 611. If an authentication process for the terminal 611 is completed by any other electronic device, the LED may skip an authentication process. When the authentication of the terminal 611 succeeds, the LEDs may be controlled by the terminal 611.

The terminal 611 may perform communication with the LEDs so as to control the LEDs. In an embodiment of the present disclosure, the LEDs are a type of electronic device capable of communication, e.g., short range communication. The terminal 611 transmits control information to the LEDs. The control information for controlling LEDs may include a control packet 620 containing an LED location. The control packet 620 may be also referred to as a device control packet, a control data packet, and the like.

Specifically, the LED location may be mapped to a destination address 621 in the control packet 620.

For example, in order to turn on the first LED 613, the terminal 611 may transmit, to the first LED 613, the control packet in which the address of the first LED 613, 00:00:00:00:00:00:AA, is mapped to the destination address 621. In order to simultaneously turn on three LEDs, the terminal 611 individually transmits control information including three control packets 620 to each LED.

In case there are two or more electronic devices to be controlled, the problem of having to individually transmit control information to respective electronic devices is created. Unfortunately, transmitting individual control information may result in additional energy consumption and time delay.

Therefore, a method for solving the energy consumption and time delay problem is needed.

Figure 7:
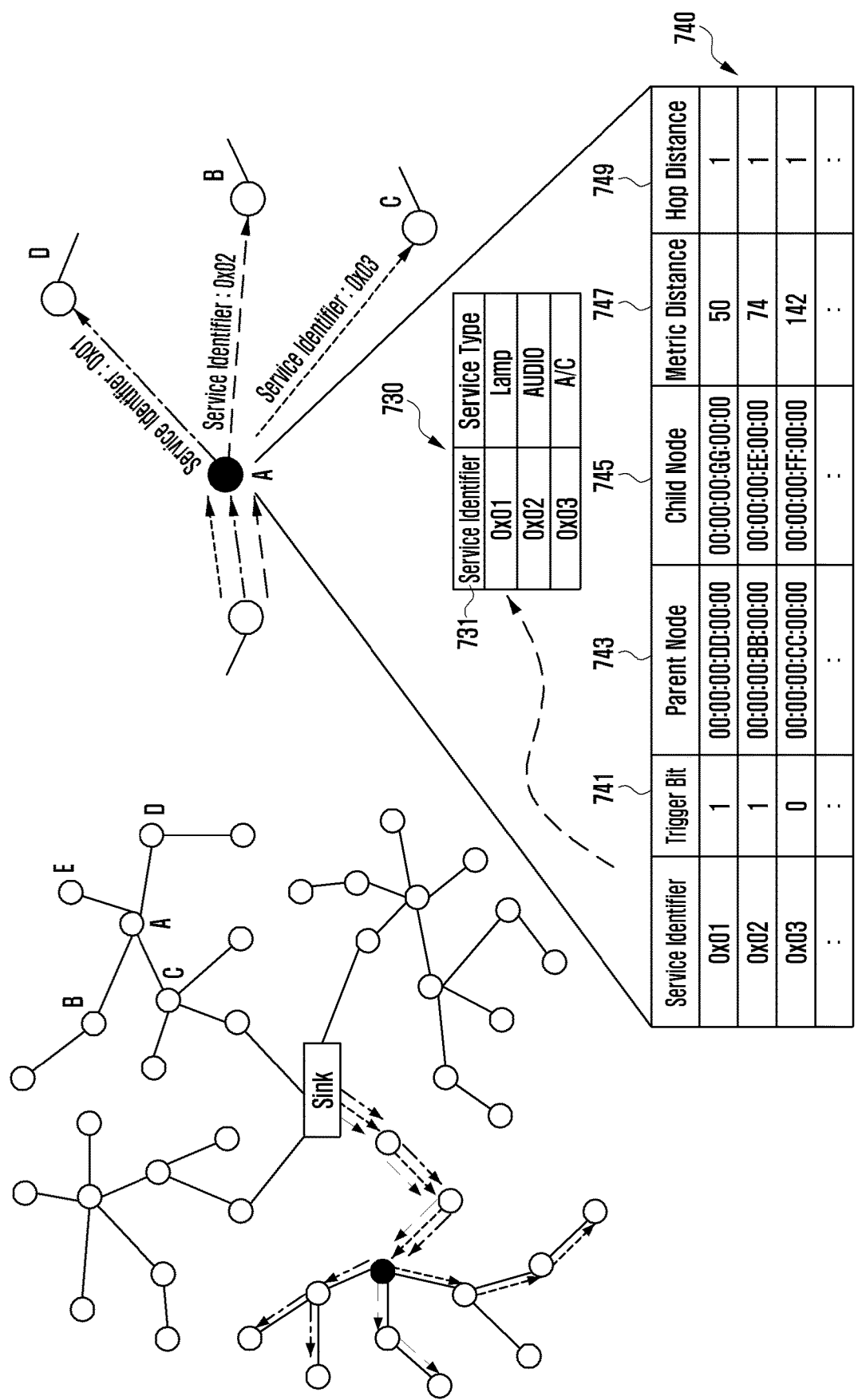
FIG. 7 is a diagram illustrating a method for controlling electronic devices through a mesh network formed of electronic devices according to an embodiment of the present disclosure.

FIG. 7 is a diagram illustrating a method for controlling another electronic device through a mesh network formed of electronic devices according to an embodiment of the present disclosure.

In FIG. 7, a single electronic device is represented as a single node (e.g., a node A). A solid line between adjacent nodes indicates that adjacent electronic devices are connected to each other. Hereinafter, an electronic device will be also referred to as a node.

When a terminal approaches a node E within a distance capable of communication, the terminal performs communication, e.g., short range communication, with node E. An electronic device that communicates with the terminal may measure the distance from the terminal by using a beacon signal and measuring the received signal strength of the beacon signal or other method of distance determination. The electronic device may transmit a measured value to the terminal through beacon data, so that the terminal may recognize proximity to the electronic device without requiring the user to enter a PIN code.

The terminal that recognizes proximity to the electronic device performs an authentication process through the node E. Since this process is discussed above with reference to FIG. 4A, a related description is omitted herein.

In case of a successful authentication of the terminal, the node E receives control information that contains a service identifier 731. Based on a list of electronic devices to be controlled, the control information may contain the service identifier 731 of such electronic devices.

The list of electronic devices may be created by a user's selection. Alternatively, the list of electronic devices may be created from frequently used electronic devices, based on information contained in authentication information used in an authentication process for the terminal.

Each node contains node information 740, namely, information about a parent node 743 to which control information 730 will be transmitted according to the service identifier 731, and information about a child node 745 to which response information will be transmitted after a control process.

If the control information 730 is transmitted to the node E, the node E may transmit the control information 730 to the parent node 743 corresponding to the service identifier 731 contained in the control information 730.

For example, node A may contain the node information 740 which is set to transmit the control information to node D in case of a service identifier 0x 01, to node B in case of a service identifier 0x 02, and a node C in case of a service identifier 0x 03. Therefore, if any control information having service identifiers 0x 01 and 0x 02 is transmitted to node A, node A may transmit the control information to node D and node B, based on information contained in the node information 740.

If a certain user having a terminal arrives at home, a door lock (corresponding to node E) performs an authentication process for the terminal. After successful authentication, the terminal transmits the control information 730 containing a service identifier to the door lock. The door lock then delivers the control information 730 to the gateway used for the authentication of the terminal. If there is no gateway, the door lock may transmit the control information to an entrance lamp, for example. The control information 730 may contain service identifiers 0x 01, 0x 02 and 0x 03, which correspond to an indoor lamp, a TV and an air conditioner, respectively.

The entrance lamp that receives the control information containing such service identifiers may transmit the received control information to nodes connected to the indoor lamp, the TV and the air conditioner, respectively. As discussed above, information about which node is a parent node is contained in the node information 740 of each node.

Such a structure in which nodes are connected to each other is referred to as a mesh network. Contrary to typical technique that has to separately transmit control information to respective electronic devices so as to control such devices, an embodiment of the present disclosure using the mesh network can simply control various types of electronic devices through a single transmission of control information that contains several service identifiers. Furthermore, when any electronic device is located at a long distance incapable of directly receiving control data of the terminal, such a device can be controlled through the mesh network.

Additionally, the node information 740 may further include trigger bit information 741. If a trigger bit for a specific service identifier is 1, an electronic device will operate when the service identifier is received.

For example, if node A has the node information 740, node A may operate when control information containing service identifiers 0x 01 and 0x 02 are received.

The node information 740 includes metric distance information 747 and hop distance information 749. Such information is used to prevent an infinite loop due to non-operation of intermediate nodes or defective transmission of control information.

If the hop distance information 749 has a value of 1, this value is increased by one in proportion to an increase in the number of nodes. If an increased value is greater than a predetermined value, the control information is not transmitted any more. The metric distance information 747 refers to a weight value of a path between nodes. For example, if there are two or more paths between node A and node D (e.g., A→C→D and A→B→D), a node having a greater weight value may be used.

Figure 8:
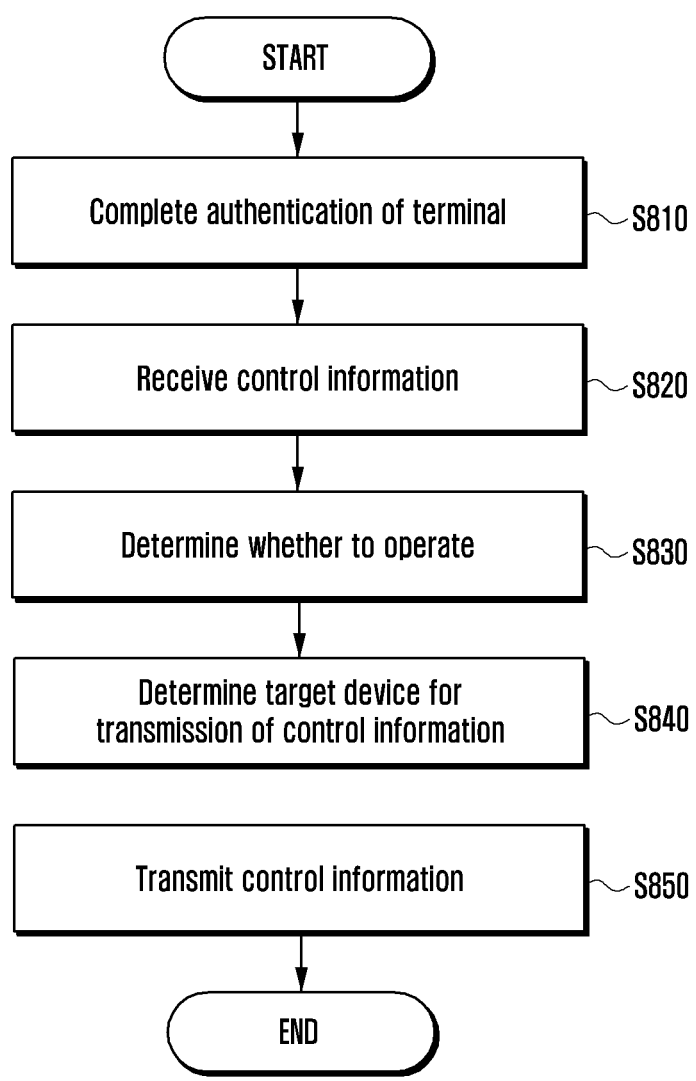
FIG. 8 is a flowchart illustrating a method of controlling electronic devices through a mesh network formed of electronic devices according to an embodiment of the present disclosure.

FIG. 8 is a flowchart illustrating the process of controlling another electronic device through a mesh network formed of electronic devices according to an embodiment of the present disclosure.

When the electronic device completes the authentication of a terminal at step S810, the electronic device receives control information having a service identifier at step S820. This control information may contain at least one service identifier according to a list of electronic devices to be controlled by a user.

The electronic device that receives the control information determines at step S830 whether to operate based on the service identifier contained in the control information. As discussed above, each electronic device (i.e., a node) stores node information, and the node information contains information about a trigger bit to be used for determining whether to operate the electronic device.

If a trigger bit in the node information has a value of 1 with regard to the received service identifier, the electronic device will operate.

At step S840, the electronic device determines a target electronic device to which the control information will be transmitted. As discussed above, the node information has information about such a target device (i.e., a parent node). Thus, depending on a service identifier, it is possible to determine a specific electronic device to which the control information will be transmitted.

At step S850, the electronic device transmits the control information to the determined device.

Furthermore, the electronic device that receives the control information may repeat the above steps.

Figure 9A:
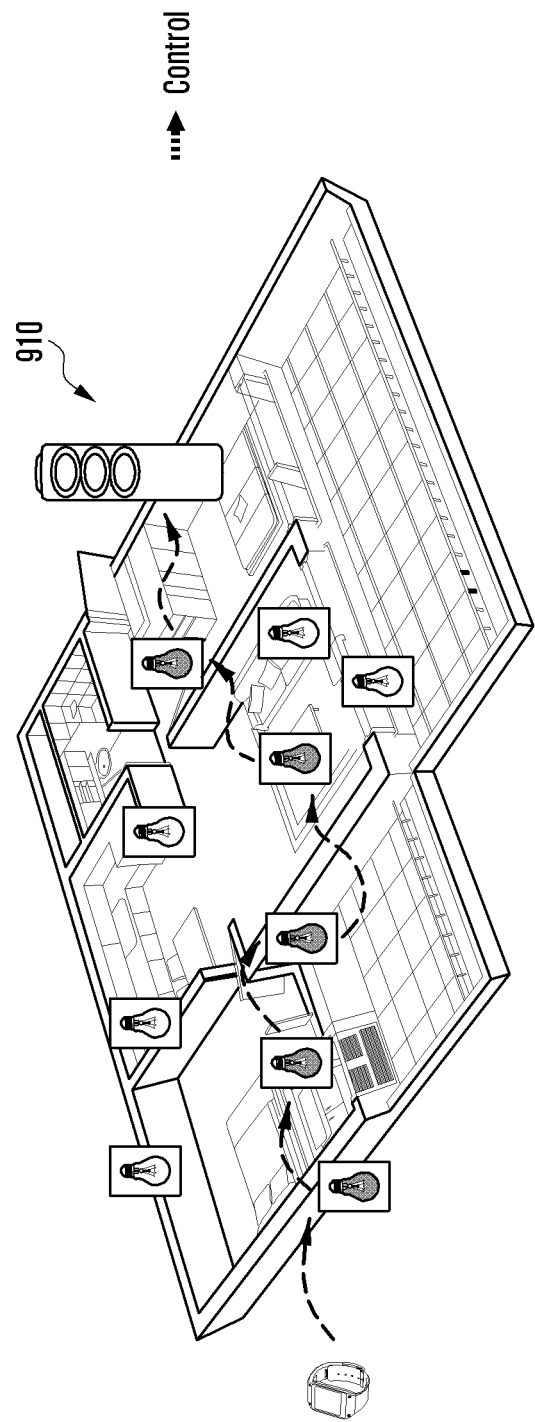
FIG. 9A is a diagram illustrating a method of operating electronic devices according to another embodiment of the present disclosure.

FIG. 9A is a diagram illustrating the process of operating electronic devices according to another embodiment of the present disclosure.

Referring to FIG. 9A, when a terminal approaches an electronic device and successfully passes authentication, electronic devices of a mesh network may operate based on control information stored in the terminal. A list of such electronic devices that will be controlled by the control information may be formed of electronic devices selected in advance by a user. Alternatively, the list of such electronic devices may be formed from frequently used electronic devices, based on information contained in authentication information used in an authentication process for the terminal.

For example, in FIG. 9A, when a terminal is authenticated, the nearest lamp, the next lamps, and the air conditioner may operate sequentially.

Figure 9B:
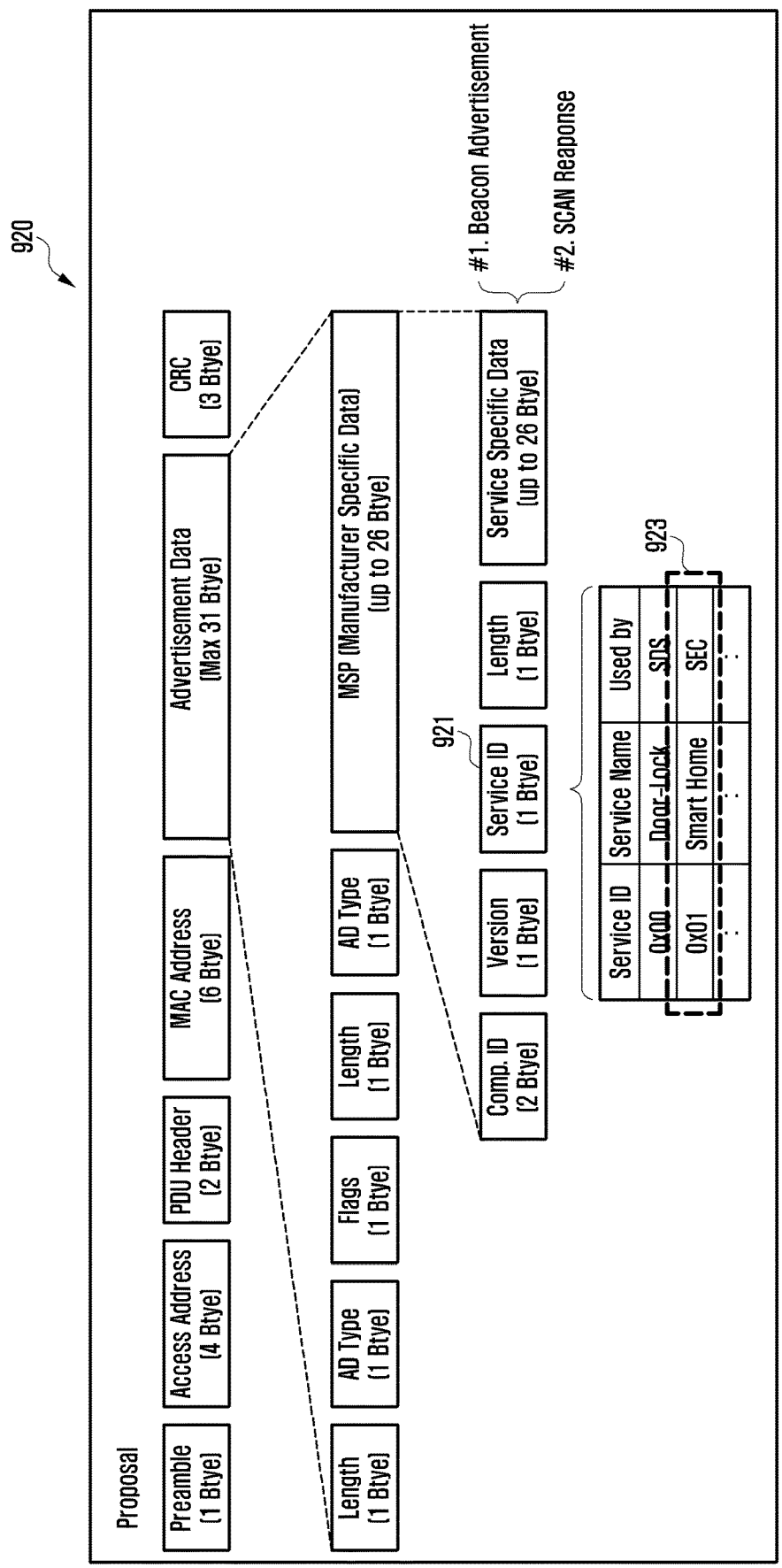
FIG. 9B is a diagram illustrating the format of a beacon frame contained in control information according to an embodiment of the present disclosure.

FIG. 9B is a diagram illustrating the format of a beacon frame contained in control information according to an embodiment of the present disclosure.

The control information transmitted for controlling the electronic device by the terminal may include a beacon frame 920, which may contain a space for allocating service identifiers 923. For example, advertisement data of the beacon frame 920 has manufacturer specific data (MSD), which may contain information about the service identifiers 923. Therefore, the electronic device that receives the control information may check the service identifier 923 contained in the control information and thereby determine a transmission target of the control information.

Figure 10:
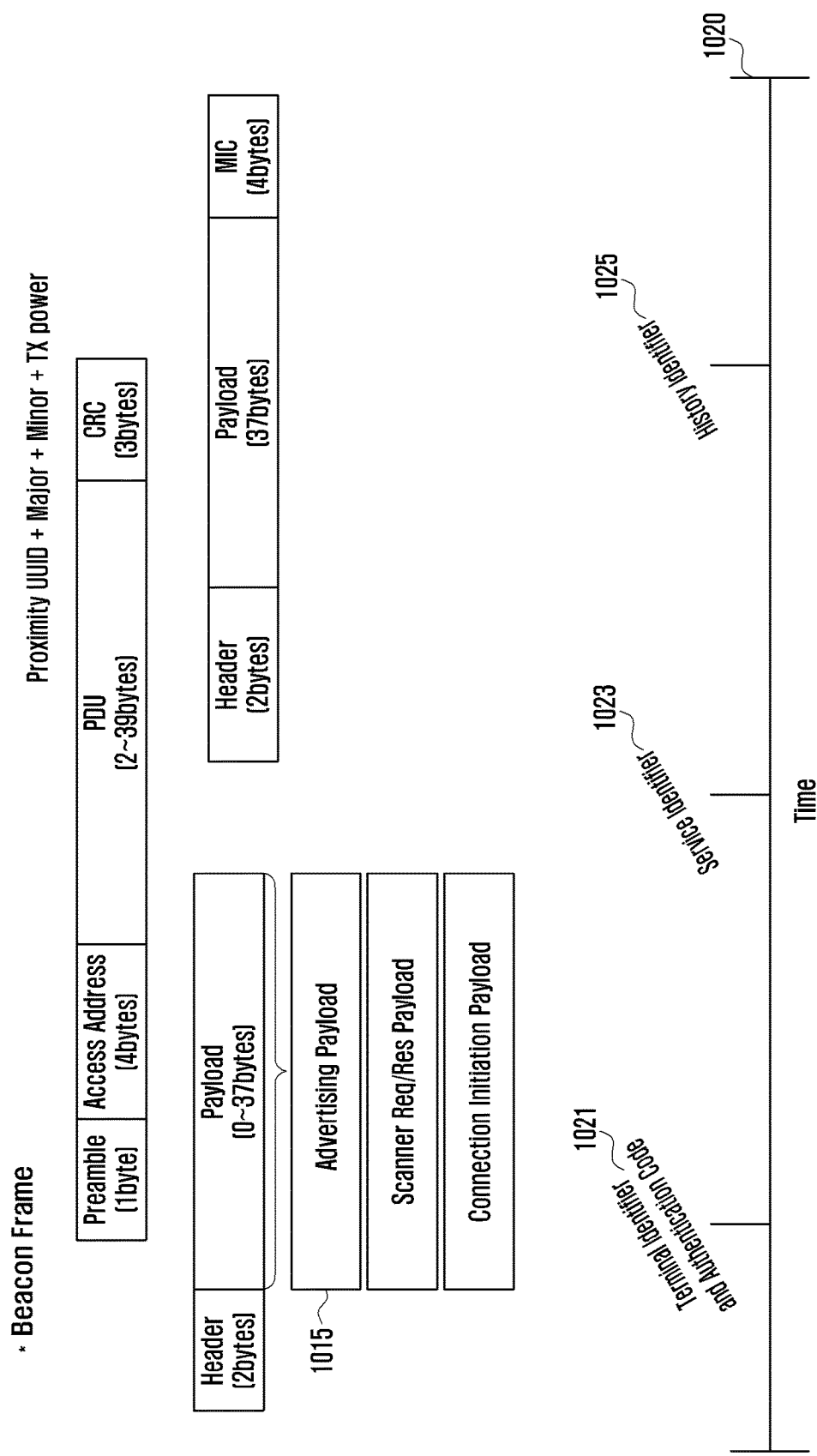
FIG. 10 is a diagram illustrating identifiers and the format of a beacon frame contained in control information according to an embodiment of the present disclosure.

FIG. 10 is a diagram illustrating identifiers and the format of another beacon frame contained in control information according to an embodiment of the present disclosure.

The control information may include a beacon frame 1010, which may contain a service identifier. For example, the beacon frame 1010 has an advertising payload 1015 additionally allocated thereto. Therefore, the terminal may transmit the beacon frame 1010 to the electronic device by inserting a service identifier into the advertising payload 1015.

Reference number 1020 indicates a change in identifiers over a time period. The terminal may control an electronic device by transmitting different identifiers according to time.

In the case where the terminal is not authenticated, the terminal may transmit a terminal identifier and an authentication code 1021 to an electronic device so as to authenticate the terminal and a user thereof.

After authentication is completed, the terminal may transmit control information containing a service identifier 1023 to control an electronic device.

When the electronic device operates based on the control information, a frequently used service may be provided using a history identifier 1025. For example, if a user is watching TV, information about a frequently watched channel, information about previously played content, and the like may be stored using the history identifier 1025. Similarly, if a user is using an audio player, a playlist may be stored using the history identifier 1025.

A user who is watching TV may receive information about a frequently watched channel. The terminal identifier 1021 may perform a role in the history identifier 1025. A related description will be provided further on in the present disclosure.

FIG. 11 is a diagram illustrating services offered by an electronic device according to an embodiment of the present disclosure.

Referring to FIG. 11, at step S1120, a terminal 1111 transmits a terminal identifier to an electronic device 1115. Then, at step S1130, the electronic device 1115 may offer a history of a previously provided services to the user. Namely, the electronic device 1115 may store, using the terminal identifier, previously provided services and, when the terminal identifier is received, may offer the stored services to the user.

For example, if a user is watching TV 1115, the terminal 1111 of the user may transmit the terminal identifier to the TV 1115. The TV 1115 may offer to the user, a list of recently watched channels, a list of played content, a user's wish list, and a list of content shared with the terminal.

As indicated by reference number 1150, a terminal 1151 may transmit a terminal identifier 1153 to an electronic device 1155 at step S1160, and the electronic device 1155 may transmit a response to the terminal 1151 at step S1170. At step S1180, the electronic device 1155 may offer a stored service to the user through the terminal identifier 1153. For example, the electronic device 1155 may continuously play certain content which has been played by the user. Alternatively, the electronic device 1155 may offer a list of user's favorite content. Alternatively, certain content being played at the terminal may be continuously played on the TV.

At step S1190, the electronic device 1155 may offer streaming of a user's selected video.

At step S1190, the electronic device 1155 may offer streaming of a video which has been streamed to the terminal.

Figure 12:
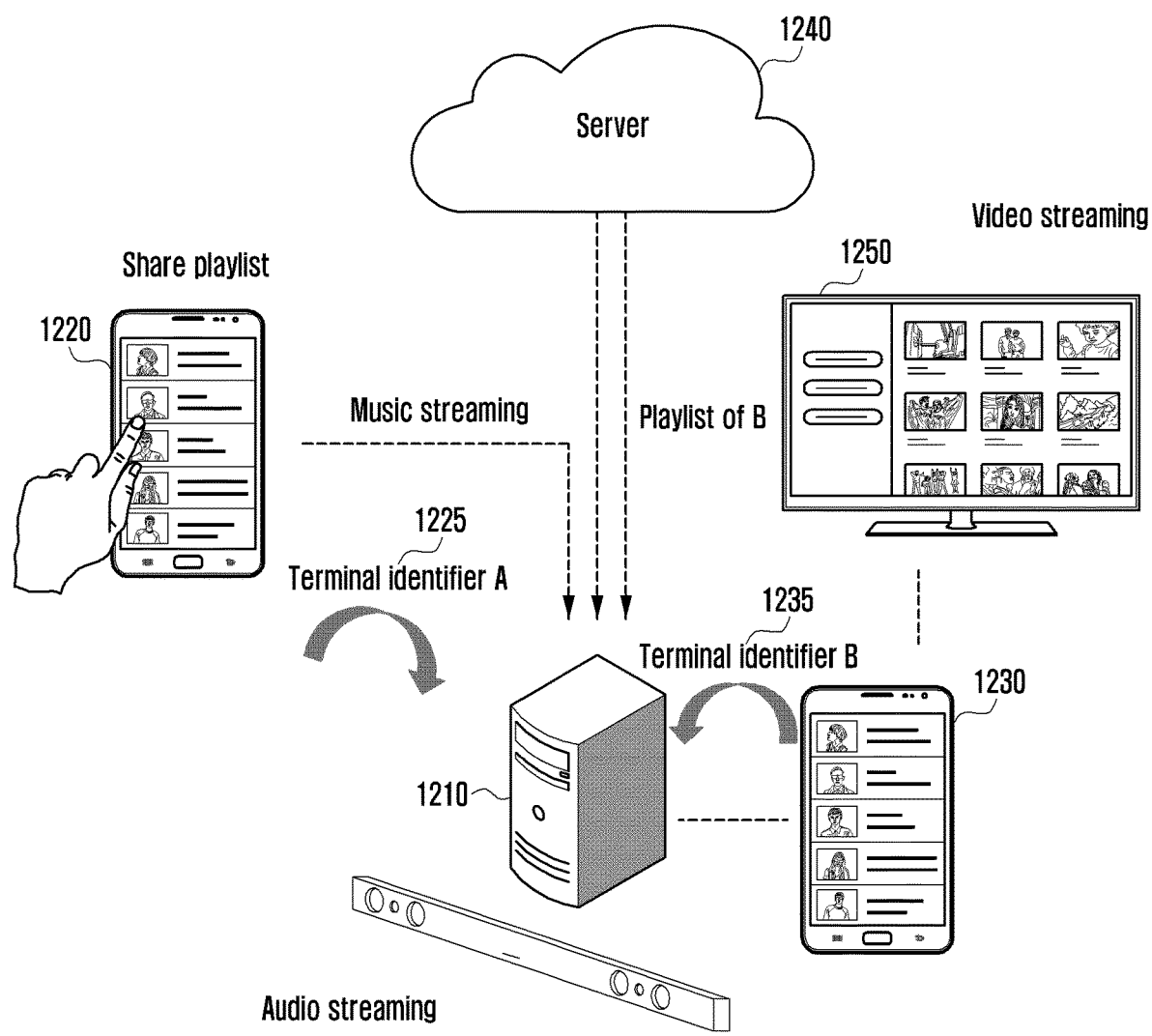
FIG. 12 is a diagram illustrating services offered by an electronic device according to an embodiment of the present disclosure.

FIG. 12 is a diagram illustrating another services offered by an electronic device according to still another embodiment of the present disclosure.

Referring to FIG. 12, like FIG. 11, an electronic device 1210 may store, using the terminal identifier, a previously provided playlist and then offer the stored playlist to the user.

For example, if the user is using an audio player 1210, a terminal A 1220 transmits a terminal identifier A 1225 to the audio player 1210. Then the audio player 1210 may offer to the user, a playlist of the terminal A 1220 stored using the terminal identifier A 1225. Alternatively, the audio player 1210 may continuously play an audio file which has been played at the terminal A 1220. Another terminal B 1230 of the same user may transmit a terminal identifier B 1235 to the audio player 1210, and then the audio player 1210 may receive a playlist, stored in association with the terminal identifier B 1235, from a server 1240. The audio player 1210 may sequentially play such playlists received from the terminal A 1220 and the terminal B 1230.

While a playlist is transmitted from the server 1240 to the audio player 1210 by using the terminal identifier B 1235 of the terminal B 1230, information about favorite channels may be transmitted to the TV 1250 by the terminal identifier B 1235 of the terminal B 1230.

Figure 13:
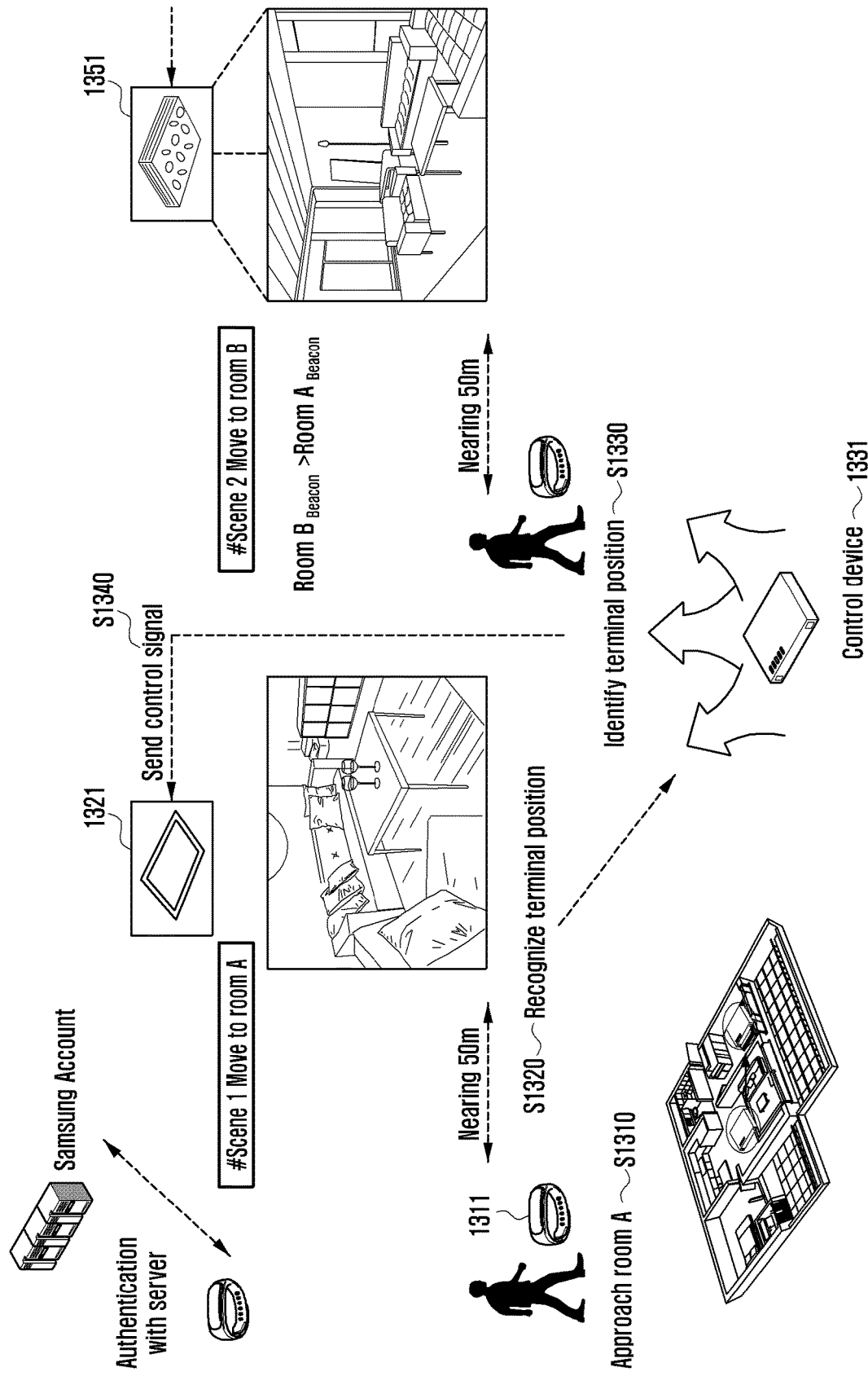
FIG. 13 is a diagram illustrating a method of operating an electronic device based on the position of a terminal according to an embodiment of the present disclosure.

FIG. 13 is a diagram illustrating a process of operating an electronic device based on the position of a terminal according to an embodiment of the present disclosure.

The electronic device is capable of communication, e.g., short range communication.

Step S1310 shows that a user having a terminal 1311 approaches room A. The terminal 1311 continuously or periodically broadcasts information such as a terminal identifier thereof.

When the terminal 1311 arrives at a given distance capable of communication with an electronic device 1321 located in the room A, the electronic device 1321 may recognize the position of the terminal 1311 at step S1320. The electronic device 1321 recognizes that the terminal 1311 is within a given distance, and then transmits the distance or position of the terminal 1311 to a control device 1331.

The control device 1331 may identify the position of the terminal 1311 at step S1330 and then transmit a signal for controlling the electronic device 1321 to the electronic device 1321 at step S1340. Therefore, the electronic device 1321 may operate according to the control signal.

If the user having the terminal 1311 moves from room A to another room B, the electronic device 1321 located in room A and another electronic device 1351 located in room B may identify the position of the terminal 1311. If the terminal 1311 is located between room A and room B, each electronic device may compare the signal strength from the terminal 1311 and thereby select a specific electronic device having greater signal strength. In this case, the control device 1331 may control the selected electronic device to operate.

Figure 14:
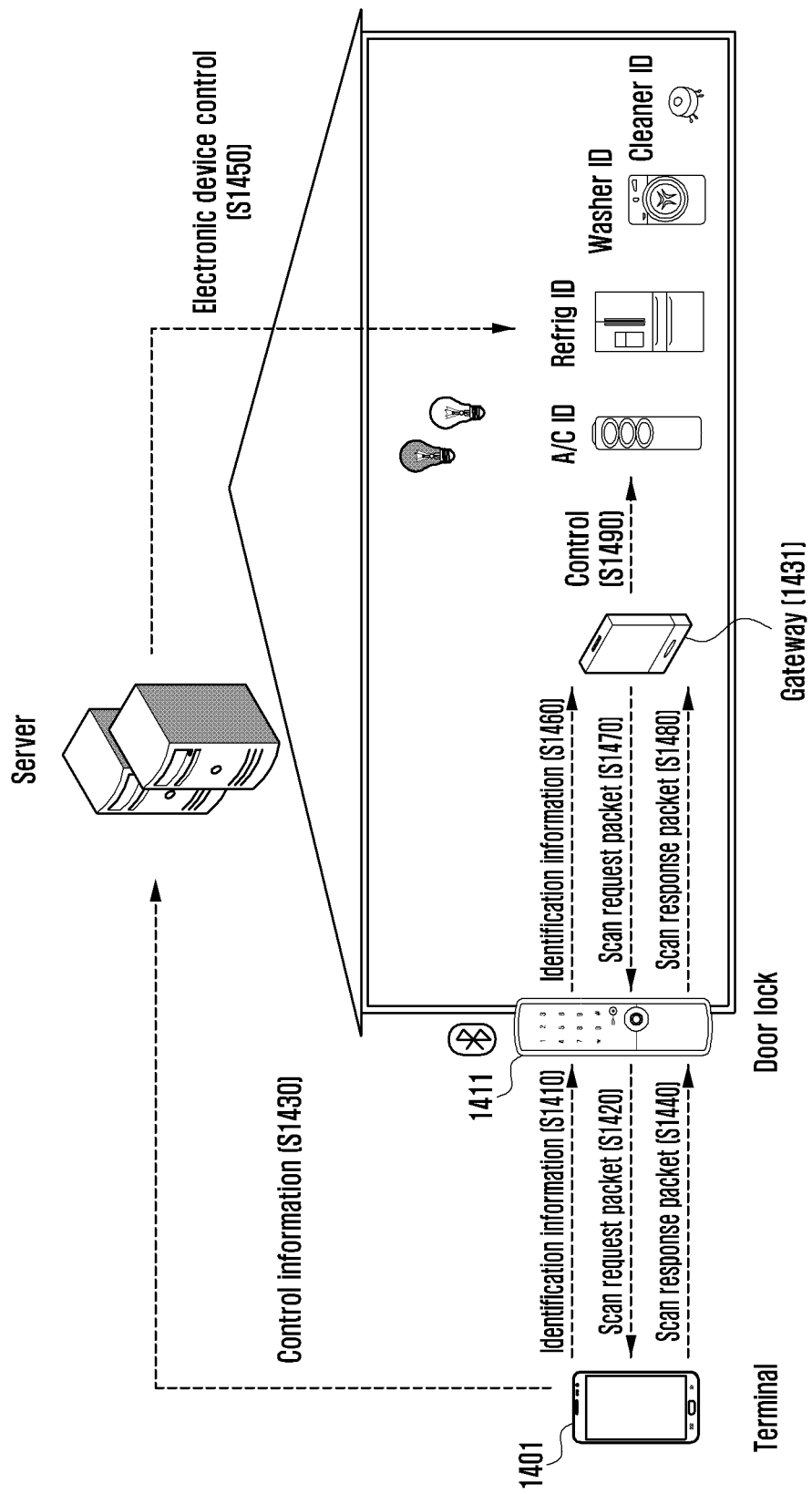
FIG. 14 is a diagram illustrating a method of controlling an electronic device according to an embodiment of the present disclosure.

FIG. 14 is a diagram illustrating the process of controlling an electronic device according to an embodiment of the present disclosure.

In FIG. 14, an electronic device 1411 is capable of communication with a terminal 1401. In an embodiment of the present disclosure, the electronic device 1411 may communicate with the terminal 1401 through Bluetooth™, for example.

At step S1410, the terminal 1401 transmits identification information for identifying the terminal 1401 to the electronic device 1411. At this step, the terminal 1401 may further transmit account information for identifying a user thereof. The electronic device 1411 receiving the identification information transmits a scan request packet at step S1420. The electronic device 1411 transmits the scan request packet in order to perform communication with the terminal 1401. For example, using the scan request packet, the electronic device 1411 may be connected to the terminal 1401 through Bluetooth™.

When the scan request packet is received, the terminal 1401 transmits control information to a server at step S1430. At step S1450, the server controls an electronic device on the basis of the received control information.

The control information transmitted by the terminal may contain a service identifier, and electronic devices may form a mesh network and be controlled respectively.

Alternatively, the control information may contain a destination address of a specific electronic device to be controlled, and the server may control such electronic devices by transmitting the control information to the respective electronic devices.

The terminal 1401 that receives the scan request packet may transmit a scan response packet to the electronic device 1411 at step S1440 so as to be connected to the electronic device 1411 through Bluetooth™, for example.

The electronic device 1411 receiving the scan response packet may perform an authentication process for the terminal 1401 as discussed above. Alternatively, the authentication process may be performed when the electronic device 1411 receives the identification information at step S1410.

At step S1460, the electronic device 1411 receiving the scan response packet transmits identification information to a gateway 1431. Identification information includes identification information about the terminal and identification information about the electronic device.

The gateway 1431 receiving the identification information transmits a scan request packet to the electronic device 1411 at step S1470 to communicate with the electronic device 1411. At step S1480, the electronic device 1411 transmits a scan response packet to the gateway 1431 and is connected to the gateway 1431.

As discussed above, in the case where communication connections are established between the terminal and the electronic device and between the electronic device and the gateway, the terminal may control electronic devices through the electronic device and the gateway at step S1490. Such electronic devices may form a mesh network as discussed above.

Figure 15:
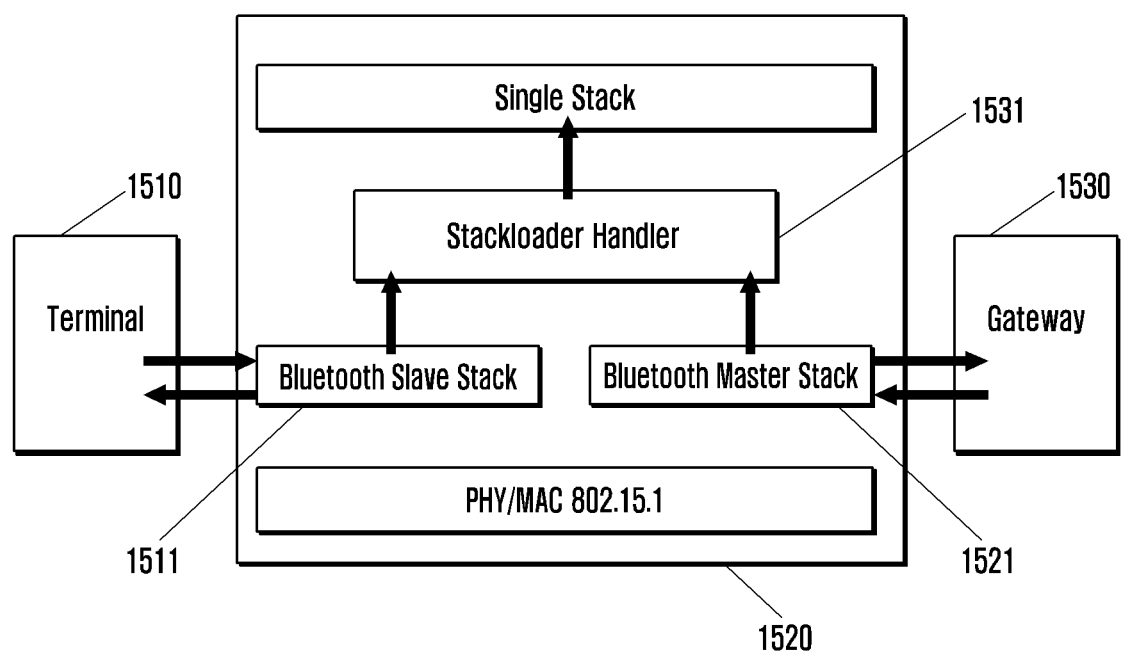
FIG. 15 is a diagram illustrating a communication protocol stack configured to control an electronic device through another electronic device and a gateway from a terminal according to an embodiment of the present disclosure.

FIG. 15 is a diagram illustrating a protocol stack for control of an electronic device through another electronic device and a gateway at a terminal according to an embodiment of the present disclosure.

The typical structure of a Bluetooth™ communication stack performs point-to-point communication only between a master stack and a slave stack. When a terminal and a gateway are connected to each other, only a single stack mode is available.

An electronic device 1520 of the present disclosure operates in a slave mode in the case of communication with the terminal and operates in a master mode in case of communication with the gateway.

When the electronic device communicates with the terminal, the electronic device operates in slave mode, and the terminal operates in master mode. The electronic device may receive a terminal identifier and an authentication code from the terminal.

The electronic device should also transmit the authentication code to the gateway in order to perform an authentication process, and also a stackloader and handler 1531 performs a stack load and conversion of a master mode. A message for a connection based on a master mode is transmitted to the gateway, and the electronic device may be connected in master mode to the gateway. The gateway performs authentication by receiving the authentication code from the electronic device and also transmits an authentication result to the electronic device.

Using the stackloader and handler 1531, the electronic device may operate as a master stack and a slave stack, and trilateral communication may be performed among the terminal, the electronic device and the gateway. Therefore, the terminal may control electronic devices through the electronic device and the gateway.

While the present disclosure has been particularly shown and described with reference to embodiments thereof, it will be understood by those skilled in the art that changes in form and details may be made therein without departing from the spirit and scope of the disclosure as defined by the appended claims.

What is claimed is:

1. A terminal for controlling at least one electronic device, the terminal comprising:
   a transceiver; and
   a controller configured to:
   control the transceiver to transmit, to a first electronic device, a first signal including a beacon identifier (ID) that includes authentication information, the authentication information including a terminal identifier for authenticating the terminal and information for authenticating a user of the terminal,
   in case that authentication of the terminal is successfully completed based on the authentication information, change the authentication information in the beacon ID to a service identifier corresponding to second electronic devices to be controlled among a plurality of electronic devices, the service identifier corresponding to a service type provided by the second electronic devices, and
   control the transceiver to transmit a second signal including the beacon ID to the first electronic device to operate the second electronic devices based on the service identifier,
   wherein the service identifier is used to transmit control information corresponding to the second signal to the second electronic devices for operating the second electronic devices through a network in which the plurality of electronic devices including the second electronic devices are connected to each other,
   wherein the information for authenticating the user includes account information that is used for the authentication of the terminal, and
   wherein the service identifier is changed to a history identifier for providing at least one of a pre-stored list of services, a pre-used service, and pre-played content.

2. The terminal of claim 1, wherein the controller is further configured to control the transceiver to communicate with the first electronic device through short range wireless communication, and
   wherein the service identifier is changed to a history identifier for providing a pre-stored list of services to the terminal.

3. The terminal of claim 1, wherein the controller is further configured to control the transceiver to transmit the first signal in case that the terminal enters an area capable of communication with the electronic device.

4. The terminal of claim 1, wherein the account information includes access information required for authentication of the terminal, refresh information for refreshing the access information, and an authentication code for encoding the access information and the refresh information.

5. The terminal of claim 1, wherein the control information is transmitted to the second electronic devices based on node information included in the first electronic device and the second electronic devices.

6. The terminal of claim 1, wherein the controller is further configured to control the transceiver to periodically broadcast the terminal identifier.

7. A first electronic device comprising:
   a transceiver; and
   a controller configured to:
   control the transceiver, to receive from a terminal, a first signal including a beacon identifier (ID) that includes authentication information, the authentication information including a terminal identifier for authenticating the terminal and information for authenticating a user of the terminal, in case that authentication of the terminal is successfully completed based on the authentication information, control the transceiver to receive, from the terminal, a second signal including a beacon identifier (ID) including a service identifier corresponding to second electronic devices to be controlled among a plurality of electronic devices, the service identifier further corresponding to a service type provided by the second electronic devices, and control the transceiver to transmit, to the second electronic devices, control information corresponding to the second signal to operate the second electronic devices through a network in which the plurality of electronic devices including the second electronic devices are connected to each other based on the service identifier, wherein the authentication information in the beacon ID is changed to the service identifier in case that the authentication of the terminal is successfully completed, wherein the information for authenticating the user includes account information that is used for the authentication of the terminal, and wherein the service identifier is changed to a history identifier for providing at least one of a pre-stored list of services, a pre-used service, and pre-played content.

8. The first electronic device of claim 7, wherein the controller is further configured to control the transceiver to communicate with the terminal through short range wireless communication, and wherein the service identifier is changed to a history identifier for providing a pre-stored list of services to the terminal.

9. The first electronic device of claim 7, wherein the controller is further configured to control the transceiver to receive the first signal in case that the terminal enters an area capable of communication with the electronic device.

10. The first electronic device of claim 7, wherein the account information includes access information required for authentication of the terminal, refresh information for refreshing the access information, and an authentication code for encoding the access information and the refresh information.

11. The first electronic device of claim 7, wherein the control information is transmitted to the second electronic devices based on node information included in the first electronic device and the second electronic devices.

12. The first electronic device of claim 7, wherein the terminal identifier is periodically broadcasted by the terminal.

13. A method for controlling at least one electronic device by a terminal, the method comprising:

transmitting, to a first electronic device, a first signal including a beacon identifier (ID) that includes authentication information, the authentication information including a terminal identifier for authenticating the terminal and information for authenticating a user of the terminal;

in case that authentication of the terminal is successfully completed based on the authentication information, changing the authentication information in the beacon ID to a service identifier corresponding to second electronic devices to be controlled among a plurality of electronic devices, the service identifier corresponding to a service type provided by the second electronic devices; and transmitting a second signal including the beacon ID to the first electronic device to operate the second electronic devices based on the service identifier, wherein the service identifier is used to transmit control information corresponding to the second signal to the second electronic devices for operating the second electronic devices through a network in which the plurality of electronic devices including the second electronic devices are connected to each other, wherein the information for authenticating the user includes account information that is used for the authentication of the terminal, and wherein the service identifier is changed to a history identifier for providing at least one of a pre-stored list of services, a pre-used service, and pre-played content.

14. The method of claim 13, wherein the terminal communicates with the first electronic device through short range wireless communication, and wherein the service identifier is changed to a history identifier for providing a pre-stored list of services to the terminal.

15. The method of claim 13, wherein the first signal is transmitted in case that the terminal enters an area capable of communication with the electronic device.

16. The method of claim 13, wherein the account information includes access information required for authentication of the terminal, refresh information for refreshing the access information, and an authentication code for encoding the access information and the refresh information.

17. The method of claim 13, wherein the control information is transmitted to the second electronic devices based on node information included in the first electronic device and the second electronic devices.

18. The method of claim 13, further comprising periodically broadcasting the terminal identifier.

19. A method of a first electronic device, the method comprising:

receiving, from a terminal, a first signal including a beacon identifier (ID) that includes authentication information, the authentication information including a terminal identifier for authenticating the terminal and information for authenticating a user of the terminal;

in case that authentication of the terminal is successfully completed based on the authentication information, receiving, from the terminal, a second signal including the beacon ID including a service identifier corresponding to second electronic devices to be controlled among a plurality of electronic devices, the service identifier further corresponding to a service type provided by the second electronic devices; and transmitting, to the second electronic devices, control information corresponding to the second signal to operate the second electronic devices through a network in which the plurality of electronic devices including the second electronic devices are connected to each other based on the service identifier, wherein the authentication information in the beacon ID is changed to the service identifier in case that the authentication of the terminal is successfully completed, wherein the information for authenticating the user includes account information that is used for the authentication of the terminal, and wherein the service identifier is changed to a history identifier for providing at least one of a pre-stored list of services, a pre-used service, and pre-played content.

20. The method of claim 19, wherein the electronic device communicates with the terminal through short range wireless communication, and wherein the service identifier is changed to a history identifier for providing a pre-stored list of services to the terminal.

21. The method of claim 19, wherein the first signal is received in case that the terminal enters an area capable of communication with the electronic device.

22. The method of claim 19, wherein the account information includes access information required for authentication of the terminal, refresh information for refreshing the access information, and an authentication code for encoding the access information and the refresh information.

23. The method of claim 19, wherein the control information is transmitted to the second electronic devices based on node information included in the first electronic device and the second electronic devices.

24. The method of claim 19, wherein the terminal identifier is periodically broadcasted by the terminal.

* * * * *